United States Patent [19]

Czajkowski et al.

[11] Patent Number: 4,884,392

[45] Date of Patent: Dec. 5, 1989

[54] PROCESS AND MACHINE FOR COLLECTING OF PRODUCTS, ESPECIALLY FRUIT, FROM THE GROUND

[75] Inventors: Didier Czajkowski, Blagnac; Joël Labarthe, Rodez; Bertrand Bouyou, Cahors, all of France

[73] Assignee: Conception, Elaboration, Realisation D'Ensembles Electroniques et Mecaniques (C.E.R.E.M.), Cahors, France

[21] Appl. No.: 222,030

[22] Filed: Jul. 21, 1988

[30] Foreign Application Priority Data

Jul. 21, 1987 [FR] France .................. 87 10435

[51] Int. Cl.⁴ .......................................... A01D 46/00
[52] U.S. Cl. ...................... 56/13.1; 56/12.9; 56/328.1; 56/DIG. 8
[58] Field of Search ............ 56/328.1, 12.8, DIG. 8, 56/10.4, 12.9, 13.3, 14.5, 14.6, 17.1, 17.2, 16.5, DIG. 10, 13.1; 15/340.1, 347, 353, 354, 359, 362, 405

[56] References Cited

U.S. PATENT DOCUMENTS

| | | | |
|---|---|---|---|
| 2,594,776 | 4/1952 | Hiatt | 56/328.1 |
| 2,734,331 | 2/1956 | Phillips | 56/DIG. 8 |
| 3,165,874 | 1/1965 | Osteen | 56/DIG. 8 |
| 3,178,873 | 4/1965 | Meyer | 56/DIG. 8 |
| 3,581,483 | 6/1971 | Kohl | 56/DIG. 8 |
| 3,675,405 | 7/1972 | Denton | 56/328.1 |
| 4,194,346 | 3/1980 | Ingalls | 56/328.1 |
| 4,343,138 | 8/1982 | Neuerburg | 56/DIG. 10 |
| 4,406,112 | 9/1983 | Brooks | 56/DIG. 8 |
| 4,642,977 | 2/1987 | Ramacher | 56/328.1 |
| 4,783,951 | 11/1988 | Richards et al. | 56/DIG. 8 |

FOREIGN PATENT DOCUMENTS

2531305  2/1984  France .................. 56/328.1

*Primary Examiner*—Bruce M. Kisliuk
*Attorney, Agent, or Firm*—Harold H. Dutton, Jr.

[57] ABSTRACT

A process and machine for gathering products such as fruit from the ground and being of the type comprising a source of pressurized air connected to a delivery conduit having a nozzle near the ground, a chassis carrying an inclined ramp (12) resting on the ground opposite the nozzle, receiving means arranged near the upper end of the ramp, the delivery conduit and nozzle being arranged in such a manner that the nozzle delivers the flow of air toward the ramp (12) in a direction opposite the direction of travel of the machine, and the inclined ramp (12) is carried by articulation means adapted to confer upon the ramp a displacement movement such that its lower edge is displaced with respect to the chassis along a trajectory of which the tangent forms with the ground an acute angle opening toward the rear.

24 Claims, 10 Drawing Sheets

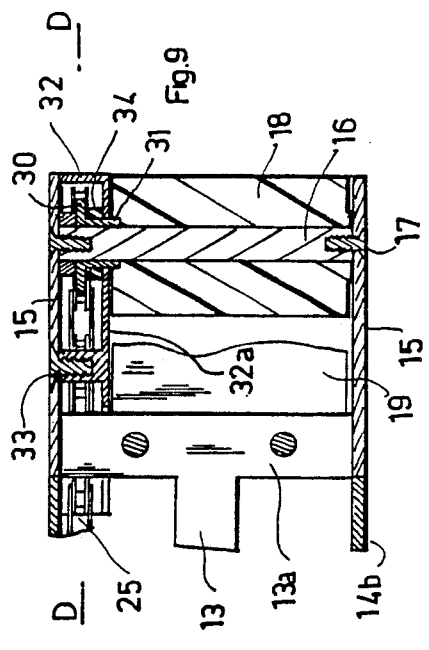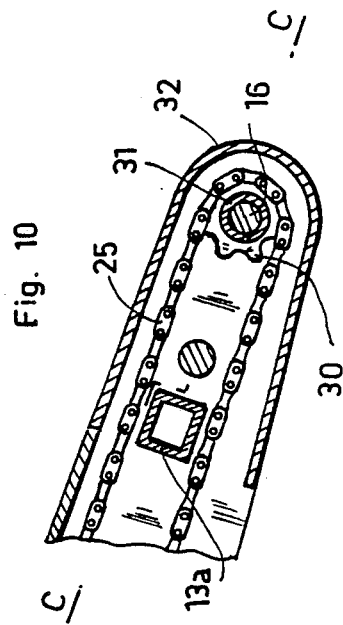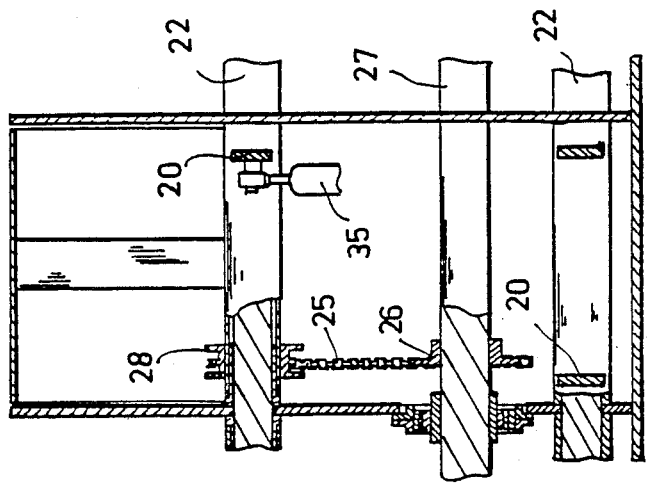

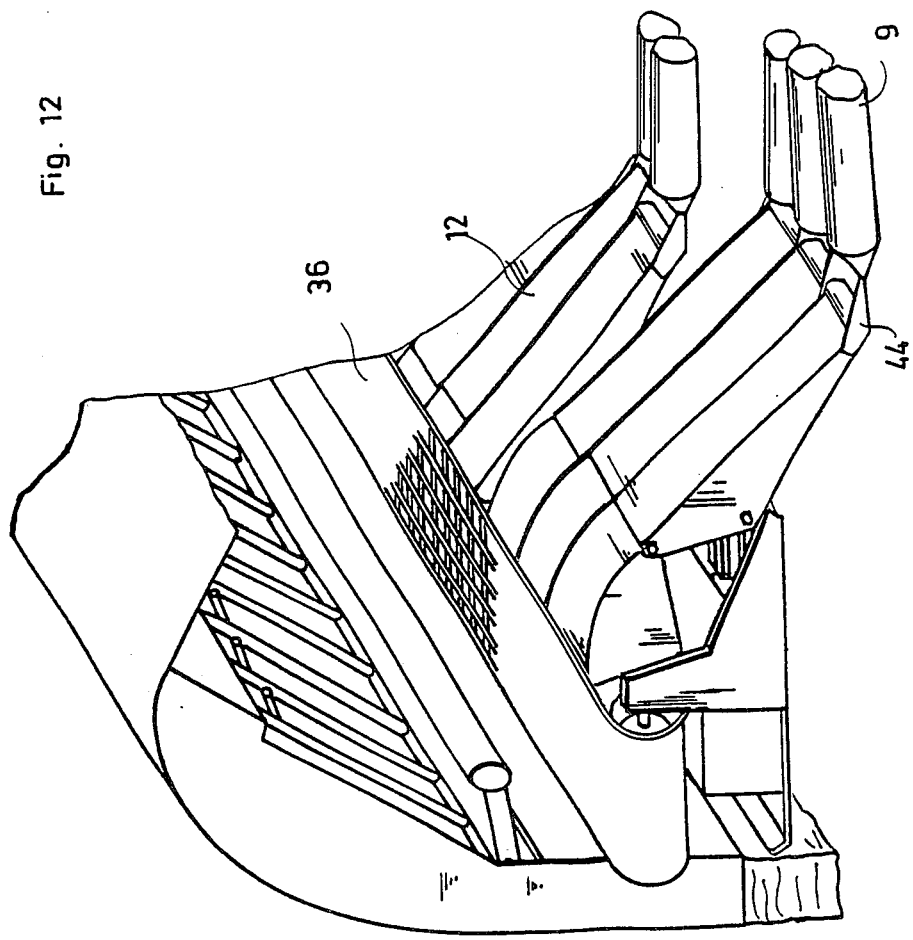

PROCESS AND MACHINE FOR COLLECTING OF PRODUCTS, ESPECIALLY FRUIT, FROM THE GROUND

This invention relates to a process for gathering of products, especially fruit, from the ground, the process being of a type comprising displacing a machine comprising frame carrying an inclined ramp coming into contact with the ground at a lower portion and forming obtuse angle and a supplemental acute angle with the ground, and propelling the products toward this ramp by means of a flow of fluid directed opposite the obtuse angle of the inclined ramp. The invention also relates to a machine for carrying out this process.

BACKGROUND AND OBJECTS OF THE INVENTION

Several machines are known which use a source of air under pressure, instead of mechanical elements, for lifting fruit or similar objects and propelling them towards an inclined ramp. However, none of these machines are able to provide, at the present time, complete satisfaction because their solutions are adopted with regard to the arrangement of the inclined ramp and the fluid blast enclosure.

According to a first technique, described particularly in U.S. Pat. Nos. 3,675,405 and 4,194,346, and French patent application No. 2,531,305, the inclined ramp and the fluid discharge casing are arranged transversly with respect to the direction of advance or travel of the machine. As a result, only the fruit which is found between the lower edge of the inclined ramp and the opening of the fluid discharge nozzle are gathered. In order to blow or sweep over a useful zone of greater size and thus avoid a significant number of passes over a field, the lower edge of the ramp is thus relatively distant from the nozzle of the blower. Therefore it is necessary to provide a blower of great power and to orient the nozzle of the blower in such a matter as to deliver an air flow which is essential horizontal.

In addition to the necessity of providing a very powerful blower, this solution leads to several disadvantages. The flow being horizontal, the fruits arranged beneath the average level of the ground are not collected. Further, by reason of the power of the blower, there are certain risks of tearing up the ground in proximity to the discharge of the blower. This type of machine is particularly unsuitable for use over vegetated ground. In effect, the flow of air has a tendency to lay down the vegetation which then acts as a deflector and therefore causes the flow of air to move upwardly, greatly reducing the percentage of fruits collected.

According to a second technique, particularly described as a variation in French patent application 2,531,305, the inclined ramp and the blower casing are arranged parallel to the direction of advance of the machine, with the direction of the flow of air being the same as the direction of advance of the machine. The lower front edge of the inclined ramp passes over the fruit before the fruit is exposed to the flow of air, and the ramp is, as a result, articulated about a transverse axis. The disadvantage relating to the significant distance separating the mouth of the blower discharge from the inclined ramp is thus overcome.

However, this technique also presents several disadvantages. The fact that the inclined ramp rises up when it encounters the fruit or natural obstacles generates a sizeable loss of air flow which seeps under the ramp and has a tendency to repel the fruit found immediately there beneath. Moreover, on ground having a lot of debris, the apparatus quickly produces behind the inclined ramp an accumulation of debris which the ramp is not able to pass over. Finally, during use of this machine in hilly terrain, the lower edge of the ramp is not in contact with the ground over its entire length, and a sizeable portion of air flow seeps under the ramp. In this latter case, the fruit found at the average level of the ground is not collected.

Accordingly, a primary object of the present invention is therefore to overcome the disadvantages of known machines while providing a process and machine able to permit collection fruit with equal efficiency regardless of the nature of the terrain (vegetated, hilly, loaded with debris, wet . . . ).

Another object of the invention is to provide a machine able to carry out a separation for eliminating fruit of very small dimensions, twigs, leaves and other debris.

Another object is to provide a machine in which the pieces or moving parts presenting risks for the operator are reduced in number and easily accessible.

DESCRIPTION OF THE INVENTION

To this end, the invention provides a process for gathering products, especially fruit on the ground, of a type comprising displacing a machine having a chassis carrying an inclined ramp coming into contact with the ground at its lower portion and forming an obtuse angle and a supplemental acute angle with the ground, and propelling the products toward this ramp by means of a flow of fluid directed toward the obtuse angle up the ramp. According to the invention, the process is further characterized in that it comprises:

directing the flow of air in a direction parallel and opposite to the direction of advance or travel of the machine in such a matter that the products are always found at the side of the obtuse angle of the inclined ramp, articulating the inclined ramp in such a matter as to enable the ramp to undergo a displacing movement such that its lower portion is displaced with respect to the chassis along a trajectory, the tangent of which forms with the ground an acute angle opening toward the rear with respect to the direction of advance of the machine.

The invention also extends to a machine adapted to be displaced or moved along the ground in order to gather products, particularly fruit, and is of the type comprising a source of air under pressure connected to a air blowing conduit which terminates in an air discharge nozzle arranged in proximity to the ground, a chassis carrying an inclined ramp provided with a lower portion resting upon the ground, opposite the blower nozzle, and receiving means arranged toward the opposite or upper end of the inclined ramp. This machine is characterized further in that the blower nozzle is arranged in such a manner that the blower nozzle delivers the flow of air toward the inclined ramp in a direction opposite to the direction of travel of the machine, and the inclined ramp is carried by articulation means adapted to cause a displacing movement thereof such that the lower portion of the ramp is displaced with respect to the chassis along a trajectory, the tangent of which forms with the ground an acute angle opening toward the rear with respect to the direction of travel of the machine.

The blower nozzle thus necessarily moves back with respect to the direction of advance of the machine, the nozzle opening being situated in proximity to the ground in order to pass over the products without touching them.

This arrangement produces, as a result, the fact that the inclined ramp, the function of which is to deflect the fruit propelled by the air flow toward the receiving means, is constantly maintained in contact with the ground at its lower portion.

To avoid a blocking of the machine which this configuration would naturally induce when the machine encounters a natural obstacle, the inclined ramp is therefore articulated in such a manner that its lower portion is displaced along a trajectory the tangent of which forms with the ground an acute angle opening toward the rear.

This articulation thus permits partially transforming the horizontal mechanical force which results when the ramp meets an obstacle, to pass over the obstacle with a rising movement causing a lifting of the ramp.

This displacing movement may be obtained by providing an inclined ramp presenting itself in the form of a slide coming into contact with the ground at its lower portion and inclined toward the rear with respect to the direction of advance of the machine. Preferably, this movement is obtained while conferring upon the ramp an equivalent movement to that of a drawn or pulled, articulated element ahead of the ramp with the respect of the direction of advance or travel of the machine.

A drawn element, that is one in which the articulation is arranged toward the front with the respect to the direction of the displacement of the machine, is in effect displaced upwardly along a circular trajectory centered on its axis of articulation, when it encounters an obstacle. This element is therefore displaced simultaneously toward the rear with the respect to the direction of advance of the machine and upwardly for overcoming an obstacle.

As indicated above, this displacing movement may be obtained by means of an articulation of the inclined ramp arranged toward the front thereof with the respect to the direction of displacement of the machine. However, according to a preferred embodiment, the articulation means comprises at least one deformable parallelogram comprising two movable links articulated at one end to a fixed chassis and at their other end each being connected to one of the extremities of a third moveable link supporting the inclined ramp.

For use in vegetated orchard or on very dry ground, the lower portion of the inclined ramp may be provided with a freely rotating roll or wheel of small diameter that the size or mean diameter of the fruit to be gathered, or curved horizontally toward the rear in such a manner as to slide along the ground. However, in order to permit the collecting of fruit on other types of ground, such as ground covered by straw or mud, this lower portion is preferably provided with a wheel of a smaller diameter than that of the fruit to be harvested, with the wheel being driven mechanically in rotation, in such a manner that its tangential sliding speed on the ground is essentially zero so that it does not cause any rubbing on the ground.

Thus, on muddy ground, one does not encounter the risk of having an accumulation of mud build up ahead of the inclined ramp, because of the small diameter wheels, and because of a sliding speed which is zero. Further, on straw covered ground, the relatively long pieces of debris are forced against the ground by the wheel before being the wheel passes over them. The smaller pieces are, however, propelled toward the receiving means with the fruit before being sorted as will be seen hereinafter.

Additionally, in order to permit an efficient gathering of fruit on uneven ground, the inclined ramp is preferably divided transversely into several separate, juxtaposed elements or shoes, articulated in such a matter as to be independently moveable one with the respect to the other.

This arrangement permits obtaining a following or tracking of the surface of the ground leading to a very good seal with the ground under the inclined ramp, and even in spite of hilly or uneven terrain encountered. Due to the seal thereby provided, the different shoes or elements perform their function of aerodynamic deflectors, permitting the transport of the fruit by means of flow of air of relatively slight flow and relatively low pressure.

To improve this seal, additionally and advantageously a predefined adjustable pressure may be applied to the inclined ramp in such a manner as to place its lower portion on the ground with a force of an intensity adjustable as a function of a nature of the ground. Thus, this pressure will be relatively great on very dry terrain, in order to avoid bouncing of the ramp on the ground. By contrast, the pressure will be relatively weak or low in muddy terrain, in order to avoid forcing the ramp into the ground.

BRIEF DESCRIPTION OF THE DRAWINGS

Other characteristics, objects and advantages of the invention will become apparent from the detailed description which follows with reference to the attached drawings which present one preferred embodiment and a variation thereof. In these drawing which form an integral part of the present description:

FIG. 8 is a transverse sectional view of one element along plain B—B of FIG. 5, in the lower position thereof;

FIG. 9 is a longitudinal sectional view along a horizontal plane C—C of FIG. 10 of the extremity of one element;

FIG. 10 is a longitudinal sectional view along a vertical plane D—D of FIG. 9;

FIG. 12 is a view in partial perspective of a variation of the gathering apparatus.

DESCRIPTION OF THE PREFERRED EMBODIMENTS

Figure 1:
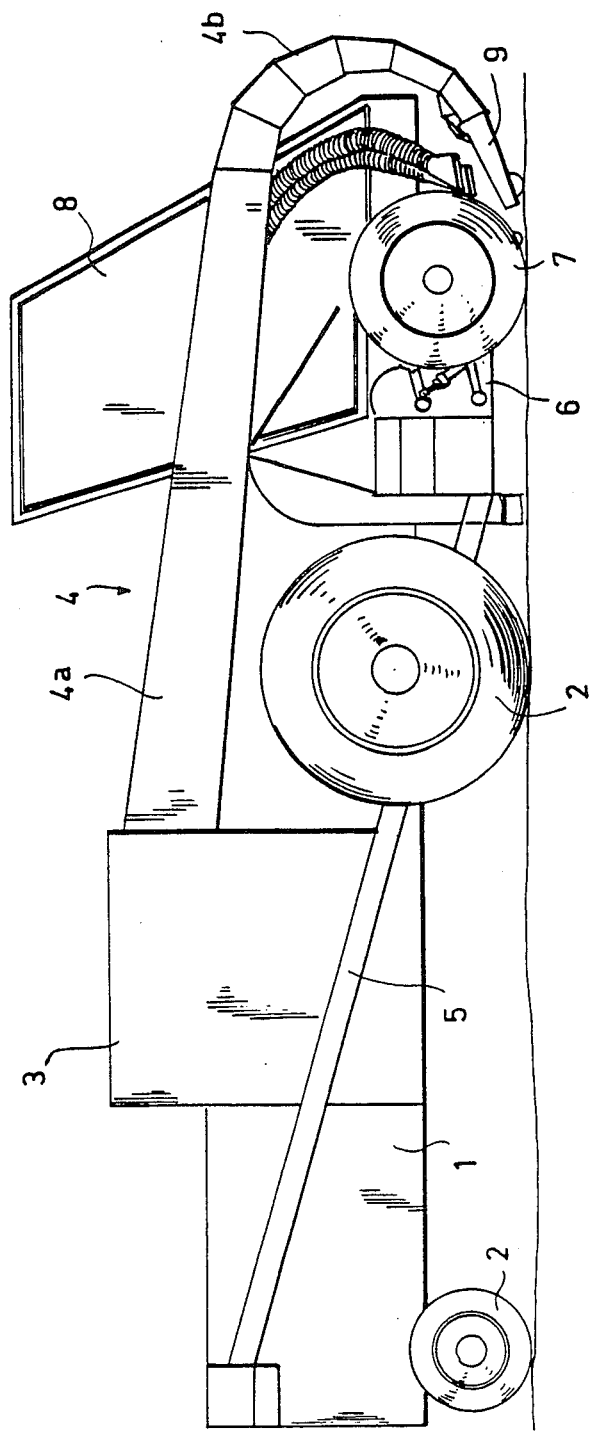
FIG. 1 is a schematic side view of a machine for gathering fruit on the ground according to the invention.

The machine for gathering fruit shown schematically in FIG. 1 is realized in connection with a conventional agricultural tractor 1 comprising a vehicle provided with several drawing connections in the rear, in order to permit its use in a direction of advancement which is opposite to the traditional direction of displacement.

This tractor 1 is provided with four wheels 2 having large pneumatic wheels, so as to not form ruts in the fields where it is used. It is also provided with a blower 3 connected to an air conduit at 4 and a lateral conveyor 5 intended to direct the fruit gathered by the apparatus towards a receptacle (not shown) mounted at the rear of the tractor, with respect to its direction of advance.

The fruit gathering apparatus is carried by a chassis 6 mounted ahead of the tractor 1, again with respect to the direction of advance thereof. This chassis 6 is carried by two transversely spaced wheels 7 and connected to the tractor by means of a double articulation coupling permitting the free movement as a function of variations of the terrain.

The chassis 6 carries an operator cab 8 offset transversely with respect to the longitudinal axis of symmetry of the tractor and, juxtaposed to this cabin, is the fruit gathering apparatus. This arrangement of cabin 8 and of the gathering apparatus has for its object to achieve a machine of which the total height permits its passage under low branches of fruit trees, while offering very good visibility to the operator.

Figure 2:
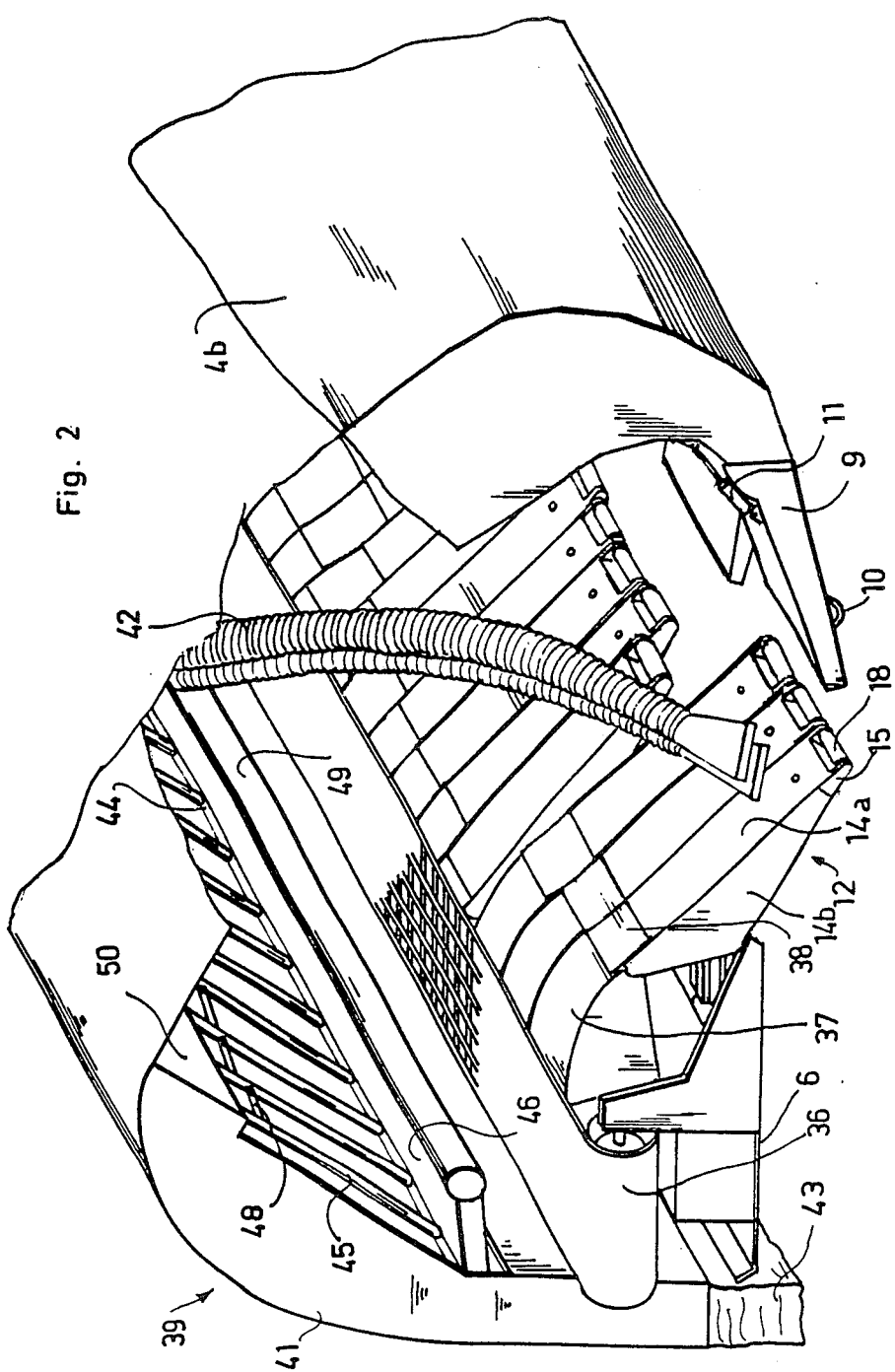
FIG. 2 is a partial perspective view of the apparatus for collecting fruit mounted in front of the machine.
Figure 3:
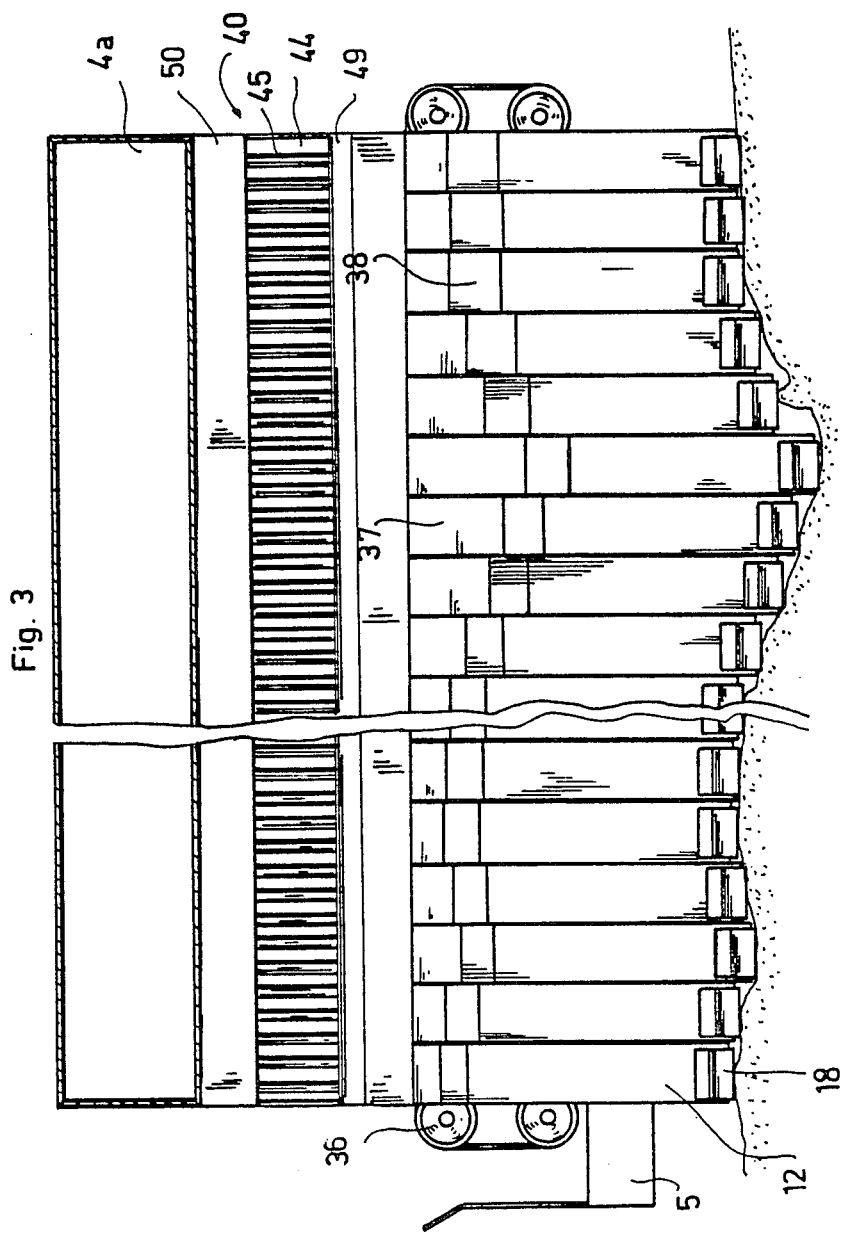
FIG. 3 is a transverse cross-sectional view along plane A of FIG. 4.
Figure 4:
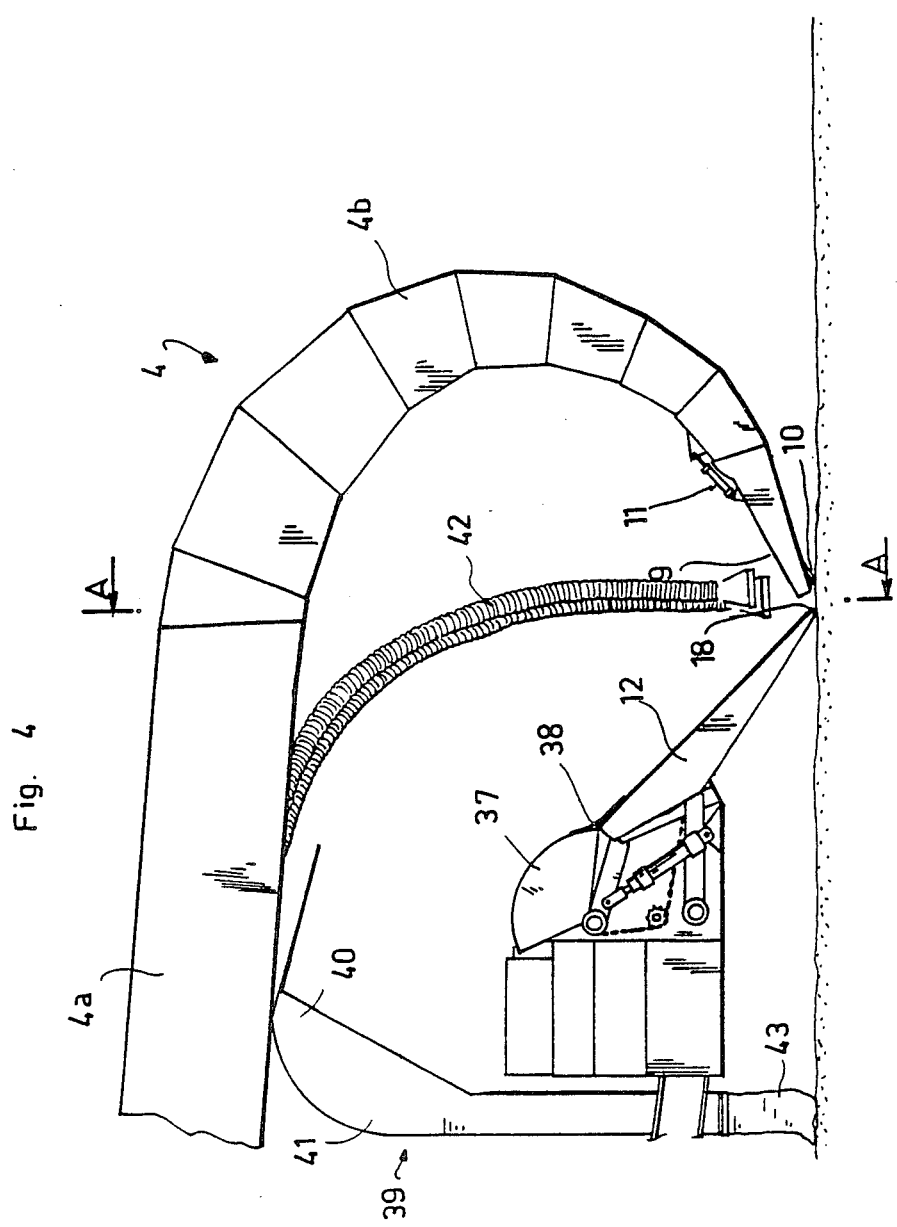
FIG. 4 is a side view of this gathering apparatus.

The gathering or collecting apparatus itself is shown in FIGS. 2-4. It comprises in the first case an air supply duct 4 connected to the blower 3 of the tractor 1. This conduit includes a plenum chamber 4a toward the front from the blower and terminating in a descending projection 4b curved toward the rear. This curved projection 4b is connected in its extension to a plurality of separate conduits 9, juxtaposed transversely and articulated on the extremity of the chamber 4b. These conduits 9 rest on the ground by an intermediate ground contacting member 10 comprising a semicircular metallic member adapted such that the mouth of the discharge from these conduits is situated in proximity to the ground, at approximately six centimeters above the ground. These support members 10 permit the blower conduits 9, which are directed toward the rear, to pass over fruit without repelling them.

The articulation of each blower conduit 9 of the fluid conveying system to the fluid chamber 4 is obtained by means of a controllable pneumatic cylinder 11, articulated respectively on the conduit and the plenum 4. The use of such cylinders 11 presents a double advantage. Firstly, it permits maintaining the contact members 10 urged against the ground with a force of intensity which is adjustable as a function of the nature of the terrain and independently of the position of the conduits 9. To this effect, the pressure of the different cylinders is adjusted by means of a single pressure control in such a manner that all of the conduits 9 are placed against the ground with an even force. Secondly, these jacks permit rapidly raising the conduits 9 from the ground, at the end of a row, in order to permit maneuvering the direction of the machine.

A conduit 42 of the transverse fluid passage way, with the respect to the direction of advance of the machine, is also connected to the fluid plenum 4a. This blowing conduit 42 is arranged in such a manner as to deliver a lateral flow of air, at one side of the machine, intended to repel the fruit situated in the alignment of the trees and permit their collection upon passage of the machine in the adjacent row.

Opposite the lower opening of the conduits is found an inclined ramp elevated with respect to the ground in the direction of the flow of air. This inclined ramp is formed by a plurality of separate shoes or elements 12, juxtaposed transversely. The number of elements 12 is greater than the number of air blowing conduits 9. For example, a machine provided with 23 such elements of 10 centimeters of width would have 8 blower conduits of 30 centimeters width.

Figure 5:
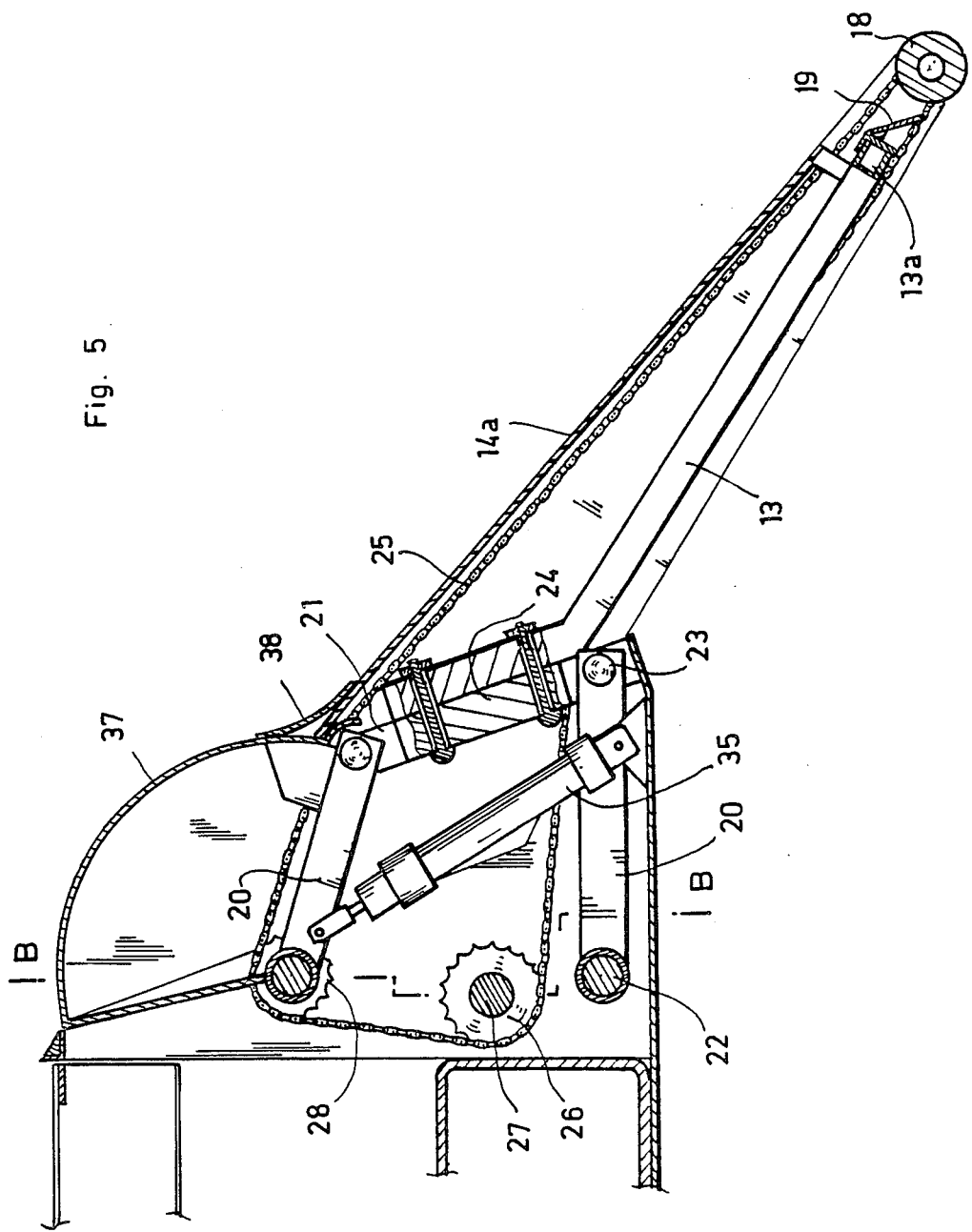
FIG. 5 is a longitudinal sectional view of one of the elements forming the inclined ramp of this apparatus, in the lower position thereof.
Figure 6:
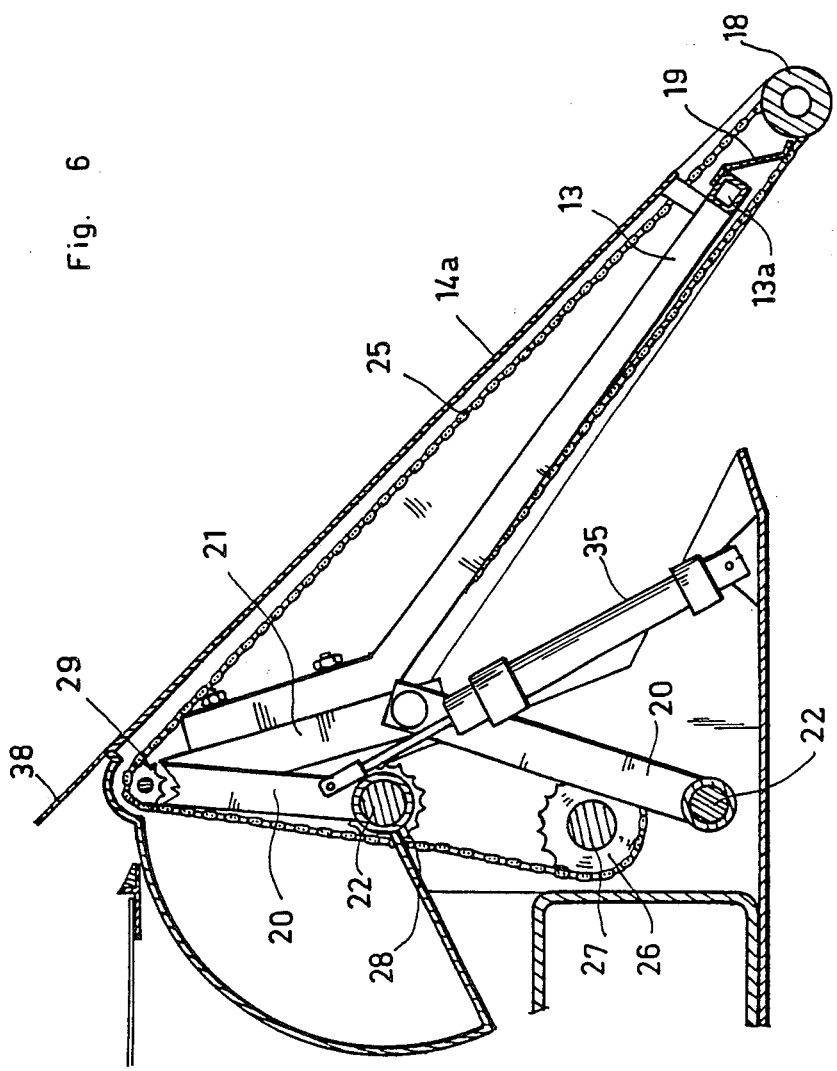
FIG. 6 is a longitudinal sectional view of this element in its upper position.

Each of these elements 12 comprises a longitudinal and inclined central member 13 (FIGS. 5 and 6) curved upwardly in its upper half, and presenting a T-shape at its lower extremity. On this central member 13 is fixed an aluminum cover having a frontal wall 14a forming an aerodynamic deflector for the air flow and lateral walls 14b (FIG. 2) on opposite sides of this member 13.

The two lateral walls 14b are interrupted at the level of the T-shaped extremity of the central member 13 and are prolongated by two stainless steel flanges 15 in welded to extremities of the transverse bar 13a of this T. These two flanges 15 support a bronze axle 16 (FIG. 9) secured by means of two screws 17, around which is arranged a transverse polyurethane wheel 18, of smaller diameter than the size of the fruit to be gathered.

The frontal wall 14a of the cover extends to the lower extremity of the central member 13, in such a manner as to become essentially tangential to the transverse wheel 18.

Further, a scraper 19 (FIG. 5) is fixed to the transverse bar 13a forming the extremity of central member 13. This scraper 19 is of a form adapted to come essentially tangentially into contact with the transverse wheel 18 at one of its lateral generatrices, in such a manner as to remove any deposits, especially mud, susceptible of being accumulated on this wheel.

The attachment of each shoe or element 12 on the chassis 6 is achieved by means of two deformable parallelogram linkages arranged transversely from one end to the other of the central member 13, to the rear thereof. Each of these parallelograms comprises two first movable links 20 each articulated at one end to the chassis 6 (FIGS. 5 and 6) and at the other end each to the extremity of a third movable link 21, at two articulation axes 22, 23 connecting the two parallelograms. The central member 13 of the element 12 is itself fixed by means of bolts to a cross-member 24 connecting the third movable links 21 of the two parallelograms.

This type of articulation offers the advantage of conferring on each element 12 a displacing movement equivalent to that of a drawn element and of which the articulation will be, as a result, arranged toward the rear, while limiting the amplitude of displacement upwardly of this element with respect to a different drawn element.

Figure 7:
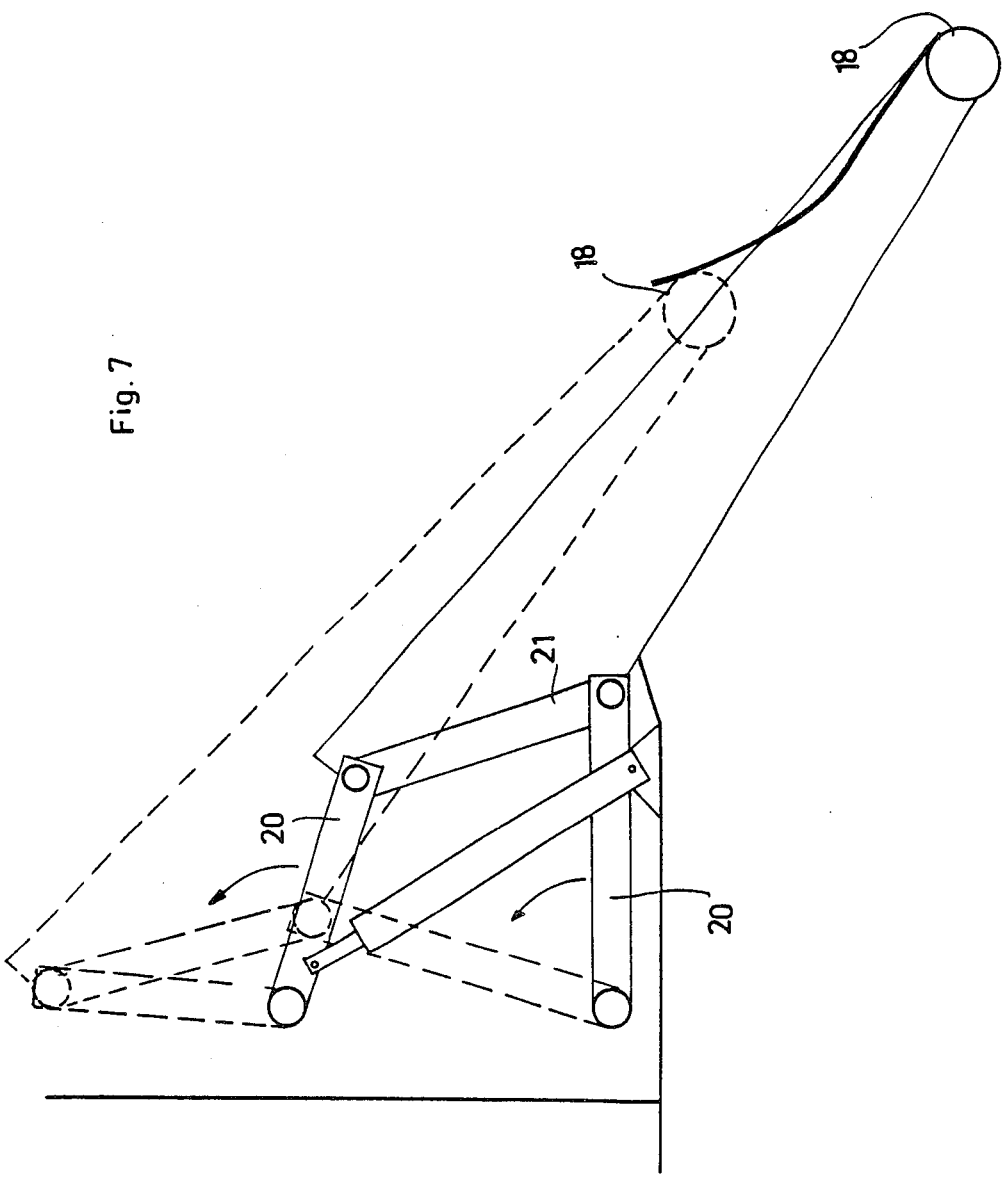
FIG. 7 is a schematic section illustrating the displacement movement of one of the elements.

This displacement movement is essential, since it permits avoiding a blockage of the machine when it encounters a natural obstacle. In effect, as shown in FIG. 7, the element rebounds relative to the direction of movement of the machine, along a trajectory essentially inclined toward the rear at 45°, and thus is subject to no blocking effect.

Further, in order to avoid any bouncing of the wheel 18 on the ground, especially in rough or muddy terrain, the wheel is driven mechanically into rotation in a manner proportional with respect to the speed of advance of the machine, in such a manner that its tangential speed of sliding on the ground is essentially zero, or slightly positive.

This driving is obtained for each element 12 by means of a chain 25 (FIG. 5) engaging a pinion 26 carried on a transverse axle 27 common to all of the elements. This chain 25 is further guided around guide pinions 28, 29 mounted on articulation axes 22, 23 of the movable links 20, 21 and arranged in such a manner as to constitute the tops of a deformable parallelogram with the drive pinion 26. This chain may thus be used without a tightener, and in spite of the vibrations of the shoe.

The rotation itself of the wheel 18 is obtained by means of the pinion 30 (FIG. 9,10) of steel mounted freely in rotation about the axis 16 carried by this wheel and extending laterally by a ring 31 recessed in a lateral face of the wheel.

It should be noted that this drive arrangement by chain and pinion may be replaced by a cable/pulley system.

Further, a guard 32 assures protection of the chain 25 at the lower extremity of the element 12. This protective guard 32 has a vertical section in the form of pins and is secured by means of screws 33 on one of the flanges 15 mounted toward the extremity of the element. It is closed outwardly, with respect to the wheel 18, by lateral wall 32a provided with an orifice for the passage of the ring 31. An O-ring 34 or seal, maintained compressed between the pinion 30 and the lateral wall 32a of the guard 32, thus permits preventing any infiltration by foreign material.

Each element 12 is also provided with a pneumatic or hydraulic cylinder 35 (FIG. 5,6) with controllable force, adapted to place the wheel 18 on the ground with an adjustable pressure as a function of the nature of the terrain and independent of the position of this element. This cylinder 35 is articulated at one end to the chassis 6, and at its other end to one of the moveable connecting links 20 of one of the deformable parallelograms. The pressure of the cylinders 35 of the different elements 12 is furthermore adjusted with the aid of a manometer or pressure control used for the cylinders 11 of the blowing conduits 9, in such a manner as to obtain a pressure proportional to that of said cylinders 11 in the blowing conduits.

The presence of the cylinders 35 combined with the fact that the inclined ramp is divided into several elements or shoes 12 independently, permits obtaining a perfect following or tracking of the ground leading to a perfect seal of the inclined plane. Each element 12 thus forms a perfect aerodynamic deflector which permits directing the fruit carried by the flow of air towards the receiving means situated to the rear of the element.

Figure 11:
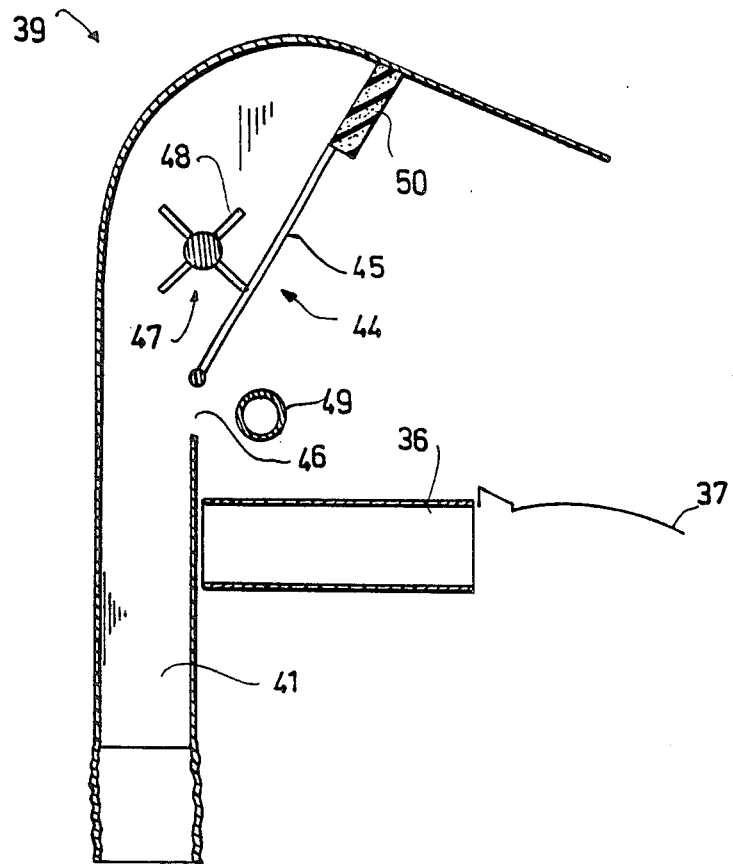
FIG. 11 is a partial longitudinal cross-sectional view along a vertical plane E of this machine.

This receiving means comprises a conveyer belt 36 (FIG. 1) transversely positioned to the rear and below the upper edge of the element 12, in such a manner as to permit the latter to be displaced upwardly. The connection between the upper edge of the element 12 and this conveyer belt 36 is achieved by means of a junction piece 37 (FIG. 11) having a transverse section of a curved shape, with a concavity oriented downwardly, superimposed above the moveable links 20 of the deformable parallelograms. This piece 37 may thus deliver to the conveyer belt 36 upon displacement of the elements 12 upwardly.

In order to attenuate the breaking of the slope which forms this junction piece 37 with the frontal wall 14a of the element, a flexible flap 38 (FIG. 5, 6) of stainless steel is furthermore fixed at the level of the upper extremity of the frontal wall. The presence of this flap 38 and the junction piece 37 thus assures the continuity of the frontal face 14a of the elements 12 up to the conveyer belt 36 which then delivers the fruit toward the lateral conveyor 5.

This conveyer belt 36 has furthermore a perforate structure of which the mesh sizes are of dimensions adapted to allow small sized fruit or foreign bodies to fall through.

Small pieces of debris, such as twigs, are carried by the air flow toward a recovery hopper 39 (FIG. 2) provided with an opening 40 situated to the rear behind the conveyer belt 36 and of a vertical section 41 adapted to deliver these objects and return them to the ground.

The lower extremity of this member 41 is provided with a flexible skirt 43 adapted to contact the ground in such a manner as to direct the flow of air toward the rear of the machine. This skirt 43 prevents the flow of air from being directed forwardly of the machine and disturbing the pneumatic operation thereof. It avoids also the situation in where by the flow would impact the soil vertically and not dig up clumps of soil.

The opening 40 is itself provided with a grill 44 comprising bars 45 arranged transversely across this opening and spaced a distance adapted to allow products and objects of small size to pass. These bars 45 present further a length arranged to provide a free passage section 46 in the lower part of the opening 40.

Additionally, a rotating comb 47 (FIG. 11) is arranged behind the grill 44. This rotating comb 47 comprises teeth 48 adapted to be inserted between the bars 40, upon rotation, in order to push back the debris retained by the grill toward the free passage section 46 of the opening 40.

In order to avoid the products not passing through the free passage section 46 the opening 40, a deflector 49 is also arranged behind the conveyer belt 36, opposite the passage section 46 (FIG. 2). This deflector 49 has a hollow cylindrical form, so as to have no risk of damaging the fruit.

The basket or receptacle 39 comprises furthermore a foam plate 50 (FIG. 11) arranged below the opening 40 and intended to avoid damaging the fruit coming to be hurdled against the frontal wall of this basket.

The machine represented in FIG. 12 is a machine overall similar to that described above, for which the blower conduits 9 do not rest on the ground by an intermediate support member, but are each connected to an element 12, by means of two flanges 51 fixed toward the extremity of the element. As a result, the number of blower conduits it identical to the number of elements. Moreover, these blowers conduits 9 are connected by means of flexible nozzle in such a manner as to be deflected with the elements.

The different characteristics of these machines thus permit the use, with the same efficiency, over all types of terrain usually encountered on farms. Moreover, the fact of using this machine with a conventional agricultural tractor provides a good flexibility and permits carrying out maintenance by conventional mechanics, without specific training thereof.

The only specific pieces of this machine susceptible of premature wear are themselves limited in number and easily accessible. These pieces are, in effect, the central member 13 of the element, the polyurethane wheel 18 and the drive chain 25 for this wheel, which may be changed without the need for specialized labor. It is remarkable further that the materials used are adapted to increase life of the different elements comprising the shoes.

While this invention has been described as having certain preferred features and embodiments, it will be understood that it is capable of still further variation and modification without from departing from the spirit of the invention, and this application is intended to cover any and all variations, modifications, and adaptations of the invention as fall within the spirit of the invention and the scope of the appended claims.

We claim:

1. A process for gathering products, especially fruit, from the ground comprising displacing a machine in a predetermined direction of travel along the ground, said machine including a chassis (6) having an inclined ramp coming into contact with the ground at a lower portion of said ramp and forming an obtuse angle and an acute supplementary angle with the ground, and propelling the products toward said ramp by means of a flow of fluid directed toward said ramp, directing the flow of fluid in a direction opposite to the direction of travel of the machine in such a manner that the products are located on the side of the obtuse angle of the inclined ramp, articulating the inclined ramp in such a manner as to confer upon said ramp a displacing movement such that the lower portion may be displaced with respect to the chassis (6) along a trajectory of which the tangent forms with the ground an acute angle opening toward the rear with respect to the direction of travel of the machine.

2. A process as in claim 1 and wherein said inclined ramp is articulated on the chassis (6) in front of said ramp with respect to the direction of movement of the machine.

3. A process as in claim 1 and including providing the lower portion of the inclined ramp with a wheel (18) of lesser diameter than the diameter of the products to be gathered, and mechanically rotatably driving said wheel in such a manner that the tangential sliding speed on the ground is essentially zero.

4. A process as in claim 1 and including dividing said inclined ramp into a plurality of separate juxtaposed elements (12) articulated in such a manner as to be able to be deflected upwardly independently of each other.

5. A process as in claim 1 and including applying a predetermined adjustable pressure to said inclined ramp in such a manner as to lay the lower portion of said ramp on the ground with a force having an intensity adaptable as a function of the nature of the ground.

6. A machine adapted to be moved along the ground for gathering products such as fruit from the ground comprising a source (3) of air under pressure connected to an air delivery means (4, 9) terminating in a nozzle arranged in proximity to the ground, a chassis (6) supporting an inclined ramp provided with a lower portion resting upon the ground opposite the opening of the nozzle, and receiving means (36) at the opposite upper end of said inclined ramp, said air delivery means being arranged in such a manner that said nozzle delivers the flow of air toward said inclined ramp in a direction opposite to the direction of movement of the machine, and said inclined ramp being supported by articulation means (20-23) adapted to confer upon said ramp a displacing movement such that the lower portion thereof may be displaced with respect to said chassis (6) along a trajectory of which the tangent forms with the ground an acute angle opening toward the rear with respect to the direction of travel of the machine.

7. A machine as in claim 6 and wherein said articulation means comprises at least one deformable parallelogram (20-23) comprising two movable links (20) articulated to said chassis (6) and to one of the extremities of a third link (21) movably supporting said inclined ramp, in such manner as to be articulated on said chassis (6) in front of said ramp, with respect to the direction of advance of said machine.

8. A machine as in claim 7 and wherein said inclined ramp is divided into a plurality of independent elements (12) each carried by individual articulation means (20-23) for permitting said elements to deflect upwardly independently of each other.

9. A machine as in claim 8 and wherein the lower portion of each of said elements (12) is provided with a transverse wheel (18) of a lesser diameter than the products to be gathered, means for rotatably driving said wheels at a speed which is a function of the speed of travel of said machine so as to drive said wheels with a tangential sliding speed on the ground of essentially zero.

10. A machine as in claim 9 and wherein said means for driving said wheels (18) comprises a drive motor including a drive shaft (27) having a drive pinion (26) opposite each of said elements, and guide pinions (28, 29) for each of said elements fixed to the extremities of said two movable links (20, 21) and arranged in such a manner as to form the tops of deformable parallelograms with a drive pinion (26), a guide pinion fixed to the axis of rotation of the wheel (18), and a transmission chain connecting the drive pinion (26) and the guide pinions (28-30), so as to rotatably drive said wheels (18).

11. A machine as in claim 6 and including at least one controllable force pneumatic cylinder (35) for urging the lower portion of said inclined ramp against the ground with a pressure adjustable as a function of the nature of the terrain, and independently of the position of said ramp.

12. A machine as in claim 8 and including at least one controllable force first pneumatic cylinder (35) associated with each of said elements (12) for urging the lower portion of said elements against the ground with a pressure adjustable as a function of the nature of the terrain, and independently of the position of said ramp, each of said pneumatic cylinders being articulated at one end to said chassis at the other end to one of said links (20), and first pressure control means connected to each of said cylinders for adjusting each of said cylinders to the same pressure.

13. A machine as in claim 12 and wherein the air delivery means comprises a plenum chamber (4) and a plurality of conduits (9) juxtaposed transversely and articulated on said plenum, each of said conduits being provided with ground support means (10).

14. A machine as in claim 13 and wherein each conduit (9) is articulated to said plenum (4) by means of a second pneumatic cylinder (11) the pressure of which is adjusted by means of a second pressure control means connected to said first pressure control means, so as to obtain a pressure proportional to that of said first pneumatic cylinders.

15. A machine as in claim 8 and wherein the air delivery means comprises an air plenum (4) and a plurality of flexible air delivery conduits (9) equal in number to the number of said elements, each of said conduits being rigidly connected to the extremity of one element (12) so that its nozzle is maintained at a predetermined distance from the lower portion of said element.

16. A machine as in claim 13 and including a blower conduit transverse with respect to the direction of travel of the machine, said conduit being connected to the blower plenum (4) and being arranged in such a manner as to deliver a lateral flow of air on one side of the machine.

17. A machine as in claim 7 and wherein said receiving means comprises a transverse conveyor belt arranged to the rear and above the upper edge of the inclined ramp, a junction piece (37) having a downwardly concave curved shape and being interposed between said conveyor belt (36) and the upper edge of the inclined ramp, said junction piece being fastened to one movable link (20) in such a manner as to be retractable under the conveyor belt (36) upon upward deflection of the inclined ramp.

18. A machine as in claim 17 and wherein the upper edge of the inclined ramp is provided with a flexible flap able to be deformed upon contact with the junction piece (37) in such a manner as to assure a continuity of slope at the level of the junction between said inclined ramp and junction piece.

19. A machine as in claim 18 and wherein the conveyor belt (36) has a perforated structure the mesh of which is of such dimensions as to allow objects of smaller dimension to pass through.

20. A machine as in claim 17 and including storage means comprising a travelling belt (5) adapted to receive the fruit transported by the conveyor belt (36) and to deliver the fruit to a trailer at the rear of the machine.

21. A machine as in claim 17 and including a recovery basket for debris provided with an opening (40) situated to the rear of said basket and above the conveyor belt (36) and a vertical section adapted to deliver the debris and deposit the debris on the ground.

22. A machine as in claim 21 and including a grill (44) comprising bars arranged transversely across said opening (40) and spaced apart a distance so as to allow undersized fruit and foreign objects to pass, said bars having a length adapted to provide a free passage section (46) in the lower part of said opening, a rotating comb (47) arranged behind said grill (44) and provided with teeth (48) adapted to be inserted between said bars (45) during rotation in order to repel debris retained by said grill toward the free passage section (46) of said opening (40).

23. A machine as in claim 22 and including a deflector (49) arranged above the conveyor belt (36) opposite said free passage section (46) of said opening (40).

24. A machine as in claim 23 and wherein said recovery basket (39) is provided with a flexible skirt (43) arranged at the lower extremity of the vertical section (41) and adapted to contact the ground in such a manner as to direct the flow toward the rear of the machine.

* * * * *